US012268639B2

(12) United States Patent
Davis et al.

(10) Patent No.: US 12,268,639 B2
(45) Date of Patent: Apr. 8, 2025

(54) INNER FOOT PANEL FOR FUNERARY VIEWING SYSTEM

(71) Applicant: Vandor Group, Inc., Richmond, IN (US)

(72) Inventors: Justin F. Davis, Richmond, IN (US); Alan H. Elder, Richmond, IN (US)

(73) Assignee: Vandor Group, Inc., Richmond, IN (US)

( * ) Notice: Subject to any disclaimer, the term of this patent is extended or adjusted under 35 U.S.C. 154(b) by 0 days.

(21) Appl. No.: 18/335,792

(22) Filed: Jun. 15, 2023

(65) Prior Publication Data

US 2023/0404832 A1 Dec. 21, 2023

Related U.S. Application Data

(60) Provisional application No. 63/352,481, filed on Jun. 15, 2022.

(51) Int. Cl.

| | |
|---|---|
| ***A61G 17/04*** | (2006.01) |
| ***A61G 17/007*** | (2006.01) |
| ***A61G 17/02*** | (2006.01) |
| *A61G 17/00* | (2006.01) |

(52) U.S. Cl.

CPC ......... *A61G 17/04* (2013.01); *A61G 17/0106* (2017.05); *A61G 17/034* (2017.05); *A61G 17/042* (2016.11); *A61G 17/004* (2016.11); *A61G 17/0073* (2013.01)

(58) Field of Classification Search

CPC .. A61G 17/04; A61G 17/0106; A61G 17/042; A61G 17/044; A61G 17/02; A61G 17/034; A61G 17/0073

See application file for complete search history.

(56) References Cited

U.S. PATENT DOCUMENTS

| | | | | |
|---|---|---|---|---|
| 4,156,956 A * | 6/1979 | Partridge | A61G 17/044 | 27/4 |
| 4,730,370 A * | 3/1988 | Elder | | 27/14 |
| 4,944,076 A * | 7/1990 | Kay | A61G 17/028 | 27/14 |
| 5,307,545 A * | 5/1994 | Stoltz | A61G 17/0073 | 27/14 |
| H1348 H * | 9/1994 | Linville | A61G 17/004 | 27/19 |
| 5,611,124 A * | 3/1997 | Biondo | A61G 17/04 | 27/14 |

(Continued)

*Primary Examiner* — William L Miller

(74) *Attorney, Agent, or Firm* — Maginot, Moore & Beck LLP

(57) ABSTRACT

An interior kit for a funeral container includes a foot panel and at least one flexible fabric sheet. The foot panel includes a top panel, a first side panel coupled to and extending downward from a first edge of the top panel, and a second side panel coupled to and extending downward from a second edge of the top panel. The first side panel and second side panel are configured to be supported by and within a funeral container while the top panel covers at least a portion of an interior of the funeral container. A top portion of the inner foot panel is narrower than a lower portion of the inner foot panel. The at least one flexible fabric sheet is configured to cover the top panel and a portion of a deceased disposed beyond the top panel within the funeral container.

19 Claims, 6 Drawing Sheets

(56) References Cited

U.S. PATENT DOCUMENTS

| | | | | | |
|---|---|---|---|---|---|
| 5,661,879 | A * | 9/1997 | Kelly | A61G 17/034 | |
| | | | | 27/4 | |
| 6,105,220 | A * | 8/2000 | Belanger | A61G 17/0073 | |
| | | | | 27/19 | |
| 7,337,484 | B2 * | 3/2008 | Cox | A61G 1/01 | |
| | | | | 128/870 | |
| 8,375,535 | B2 * | 2/2013 | Cox | A61G 17/004 | |
| | | | | 220/666 | |
| 9,056,040 | B2 * | 6/2015 | Gesell | B65D 5/64 | |
| 10,500,117 | B2 * | 12/2019 | Davis | A61G 17/034 | |
| 11,141,338 | B2 * | 10/2021 | Davis | A61G 17/042 | |
| 11,154,448 | B2 * | 10/2021 | Davis | A61G 17/001 | |
| 11,786,433 | B2 * | 10/2023 | Davis | A61G 17/02 | |
| | | | | 27/14 | |
| 2002/0166217 | A1 * | 11/2002 | Lew | A61G 17/0073 | |
| | | | | 27/4 | |
| 2006/0048353 | A1 * | 3/2006 | Brinneman | A61G 17/04 | |
| | | | | 27/2 | |
| 2010/0313396 | A1 * | 12/2010 | Cox | A61G 17/02 | |
| | | | | 27/14 | |
| 2013/0191239 | A1 * | 7/2013 | Bovard | A61G 17/00 | |
| | | | | 705/330 | |
| 2014/0000075 | A1 * | 1/2014 | Catlett | G09F 7/12 | |
| | | | | 27/14 | |
| 2014/0026378 | A1 * | 1/2014 | Gessel | A61G 17/0073 | |
| | | | | 27/14 | |
| 2017/0281448 | A1 * | 10/2017 | Davis | A61G 17/047 | |
| 2019/0015282 | A1 * | 1/2019 | Reynolds | A61G 17/042 | |
| 2020/0146920 | A1 * | 5/2020 | Davis | A61G 17/0073 | |
| 2021/0106485 | A1 * | 4/2021 | Houde | A61G 17/0073 | |
| 2023/0079701 | A1 * | 3/2023 | Davis | A61G 17/0073 | |
| | | | | 27/14 | |
| 2023/0390138 | A1 * | 12/2023 | Davis | A61G 17/007 | |

* cited by examiner

INNER FOOT PANEL FOR FUNERARY VIEWING SYSTEM

This application claims the benefit of U.S. provisional patent application Ser. No. 63/352,481, filed Jun. 15, 2022, the disclosure of which is incorporated herein by reference in its entirety.

FIELD OF THE INVENTION

This invention relates generally to systems and methods for funerary viewing.

BACKGROUND

Caskets, cremation containers, and adjacent products often perform the roles of, among other things, presenting the deceased for viewing, and for transporting the body to a place of interment or cremation. With regard to presenting the deceased for viewing, the goal is to present the deceased in a dignified manner that minimizes the distress of the viewer.

In many cases, a casket or other funerary display container has a two-part lid. One of the parts covers the upper portion of the body (when closed), and the other part covers the lower portion of the body. In caskets, these are known as half-couch caskets. During a typical viewing using a container with a two-part lid, the upper part of the lid is opened to reveal the head and upper torso of the deceased, while the lower part of the lid is left in the closed position so that the lower torso and feet of the deceased are not readily visible.

In other cases, however, funerary display containers have only a single lid, or no lid at all. In such cases, at least the lower half of the torso and feet, if not most of the deceased other than the face and neck, are typically covered by sheets or fabric coverings. U.S. Pat. Nos. 10,500,117 and 11,154,448 show bed sheet systems that may be used to cover any desired proportion of the deceased in a device that does not require a half-lid. Such funerary systems are particularly useful to those of limited means.

A drawback to such systems is that blankets and fabric does not easily lay in a flowing manner over the feet of the deceased. This is due to the uneven contour created by the feet of the deceased at the lowest extremity of the body. In other cases, the condition of the legs and feet of the deceased may appear unnatural and/or disturbing due to trauma and/or results of an autopsy process.

There is a need, therefore, for a better method of covering the lower half of the deceased in a funeral viewing container that is compatible with low cost funeral processes.

SUMMARY OF THE INVENTION

At least some embodiments of the invention employ an inner foot panel usable with fully open viewing trays or caskets (i.e. full-couch). In some embodiments, the inner foot panel is made from low-cost materials suitable for cremation, and which can be capable of low-cost assembly.

In a first embodiment, an interior kit for a funeral container includes a foot panel and at least one flexible fabric sheet. The foot panel includes a top panel, a first side panel coupled to and extending downward from a first edge of the top panel, and a second side panel coupled to and extending downward from a second edge of the top panel. The first side panel and second side panel are configured to be supported by and within a funeral container while the top panel covers at least a portion of an interior of the funeral container. A top portion of the inner foot panel is narrower than a lower portion of the inner foot panel. The at least one flexible fabric sheet is configured to cover the top panel and a portion of a deceased disposed beyond the top panel within the funeral container.

In one embodiment, the interior kit and/or the foot panel alone is used in combination with a funeral viewing tray system similar to that described in U.S. Pat. No. 11,154,448, which is incorporated herein by reference. The inner foot panel may be used in full couch traditional caskets, as well as other non-traditional containers having a fully open viewing configuration. The inner foot panel evens out the contour disruptions that occur at the lower portion of the body (legs and feet).

The above-described features and advantages, as well as others, will become more readily apparent to those of ordinary skill in the art by reference to the following detailed description and accompanying drawings.

DETAILED DESCRIPTION

Figure 1:
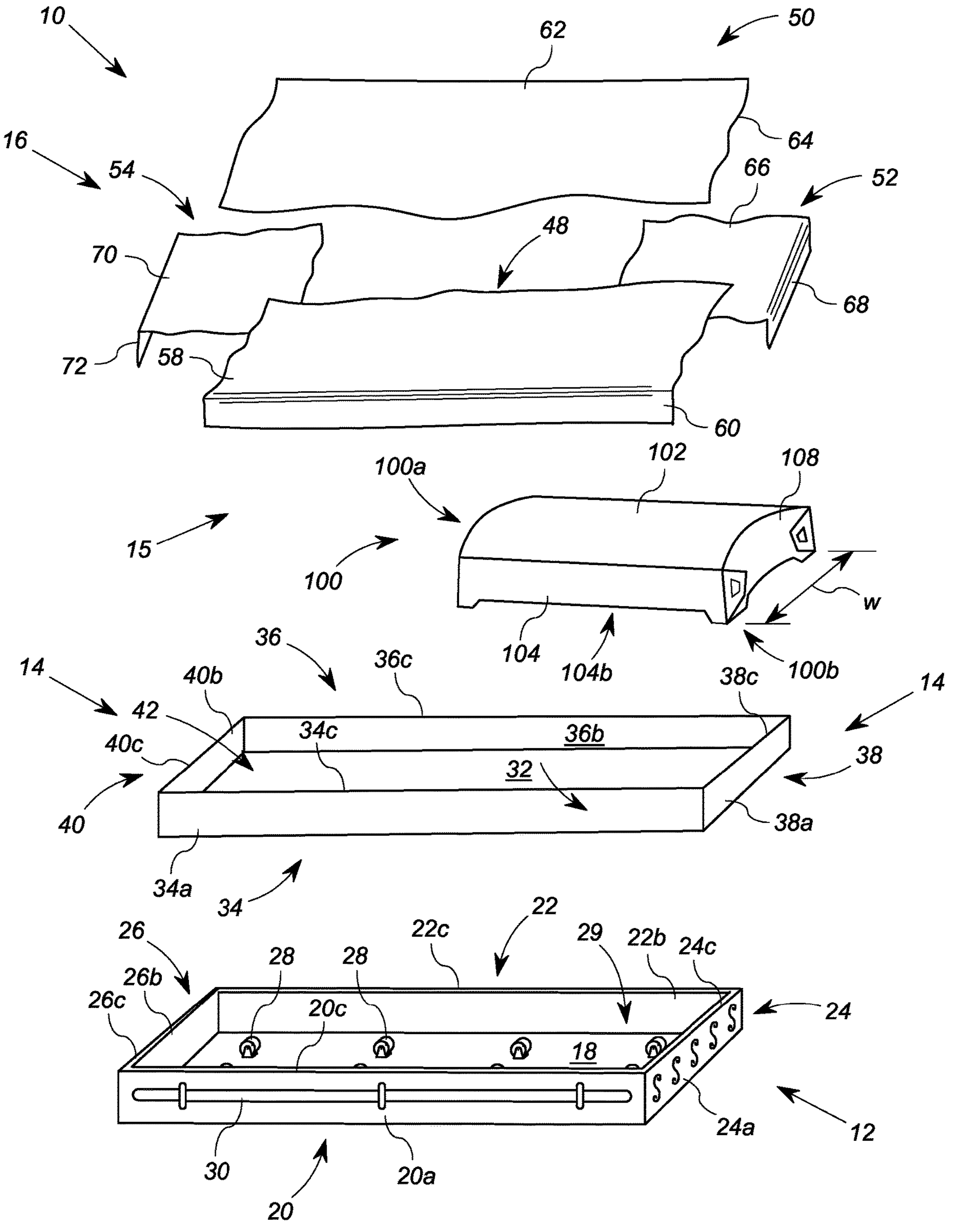
FIG. 1 shows an exploded, perspective view of a system according to a first embodiment.

FIG. 1 shows an exploded, perspective view of a funerary viewing system 10 that can employ an interior kit 15 according to a first embodiment. The system 10 includes a viewing tray 12, an insert 14, an interior kit 15. The interior kit 15 includes an inner foot panel 100 and a at least one flexible cloth sheet. As will be discussed below, the interior kit 15 in this embodiment a bedding kit 16 with a plurality of flexible sheet. In general, the viewing tray 12 is a reusable tray or shell having at least some aesthetic features into which a single-use insert 14 may be temporarily disposed. The interior kit 15, typically packaged with the single-use insert, is also designed for a single use.

Figure 2:
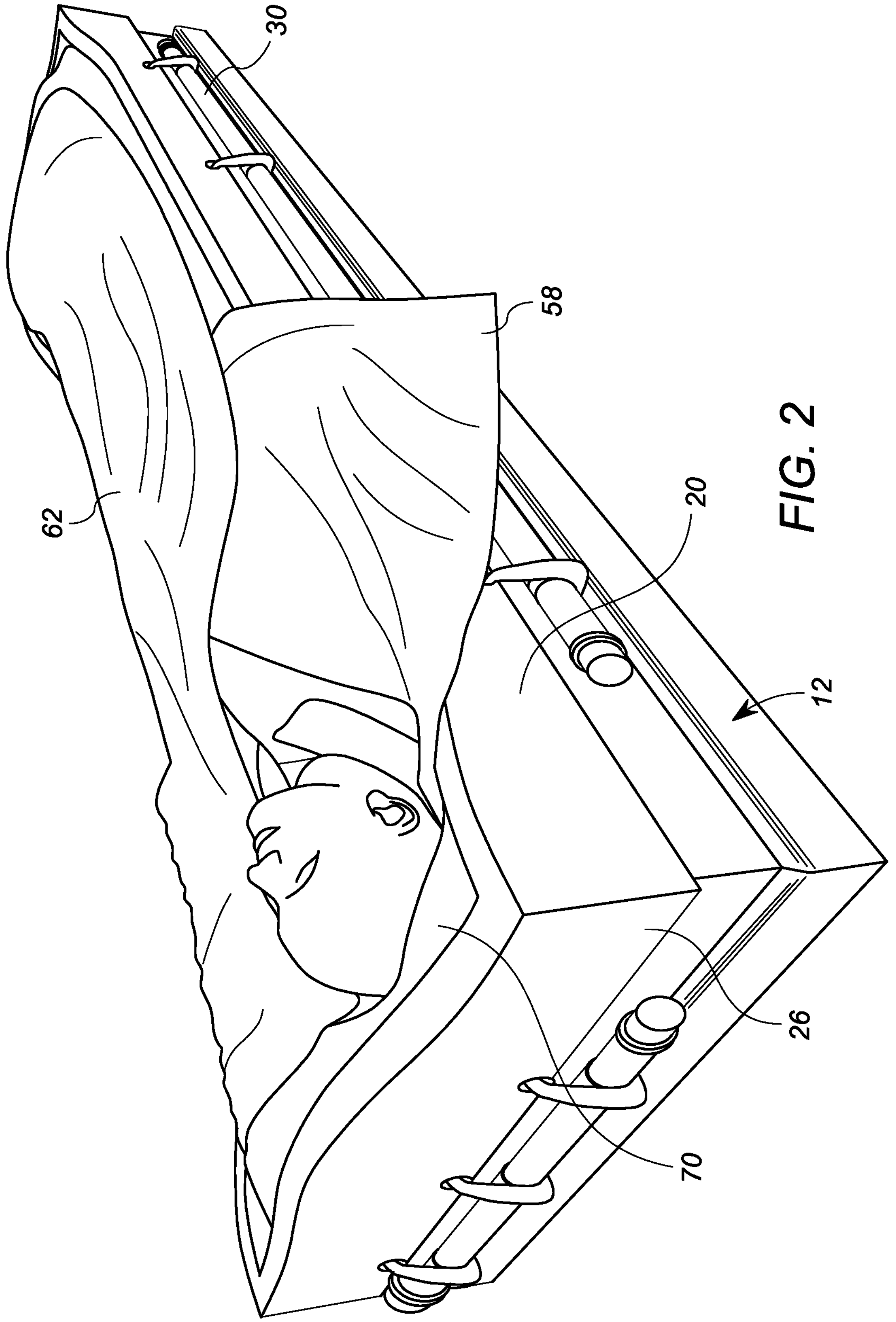
FIG. 2 shows a perspective view of the system of FIG. 1 assembled for use at a funerary viewing event.

FIG. 2 shows a perspective view of the funerary viewing system 10 fully assembled for use at a viewing event with a deceased. In general, the interior kit 15 assists providing a dignified display of the deceased in the insert 14 (not visible in FIG. 2) within the viewing tray 12.

The single-use insert 14 generally supports and reasonably fits (with respect to width and length, but not necessarily height) a deceased, adult human body lying in the supine position, as is typical for a funerary viewing event. Accordingly, for example, the insert 14 should be at least 72" long and at least 21" wide. The single-use insert 14 may suitably be constructed of an inexpensive but less aesthetically appealing material such as corrugated paper. As will be discussed below in further detail, the interior kit 15 in the embodiment includes one or more cloth assemblies used to cover at least part of the deceased and portions of insert 14.

More specifically, the viewing tray 12 includes a first side panel 20, a second side panel 22, a first end panel 24, and a second end panel 26, all coupled to a bottom panel 18 to form a walled or rimmed tray. The panels 18, 20, 22, 24, 26 define an interior 29. The viewing tray 12 has a length and width adapted to receive and reasonably fit a deceased, adult human body in the supine position. Preferably, to facilitate use of the insert 14, the viewing tray 12 has a length and width adapted to receive and reasonably fit the insert 14, which itself has a length and width adapted to receive and reasonably fit a deceased, adult human body in the supine position.

Each of the side panels 20, 22 and end panels 24, 26 is constructed primarily (more than 50% by weight and/or volume) of wood (including engineered wood products) and/or metal, and includes an exterior surface, an interior surface, and a top edge. Specifically, as shown in FIG. 1, the first side panel 20 has an exterior surface 20*a*, an interior surface 20*b* (not shown but see FIG. 6), and a top edge 20*c*. Likewise, the second side panel 22 has an exterior surface, not visible in FIG. 1, an interior surface 22*b*, and a top edge 22*c*. Furthermore, the first end panel 24 has an exterior surface 24*a*, an interior surface, not visible in FIG. 1, and a top edge 24*c*, and the second end panel 26 has an exterior surface, not visible in FIG. 1, an interior surface 26*b*, and a top edge 26*c*.

The bottom panel 18 includes a top surface 18*a*. In this embodiment, the bottom panel 18 includes a plurality of roller assemblies 28 having rollers configured to support and facilitate lateral movement of the insert 14, as will be discussed below. The roller assemblies 28 extend approximately one inch upward from the top surface 18*a*. It will be appreciated that in other embodiments would not employ roller assemblies, and still other embodiments may employ other structures that facilitate lateral movement, for example, simple wooden skids.

In this embodiment, the second end panel 26 is furthermore pivotally connected to bottom panel 18 to allow the end panel 26 to open, creating an opening 27 in the tray 12. The opening 27 is sized to allow the insert 14 to be laterally moved into and out of the viewing tray 12 on the rollers 28 via the opening 27. The top of the first end panel 26 may be manually latchable in the upright, closed position shown in FIG. 1, by suitable latching mechanisms, not shown in FIG. 1.

The viewing tray 12 may suitably have some level of ornate external design, including carved wood or shaped metal, and can include decorative and preferably functional handles 30. In this embodiment, the tray 12 does not include an attached lid.

The insert 14 in this embodiment includes a first side wall 34, a second side wall 36, a first end wall 38, and a second end wall 40 coupled to a bottom wall 32 to form a walled or rimmed tray having an interior 42. In many embodiments, the insert 14 is formed from a corrugated paper blank such that the side walls 34, 36 and end walls 38, 40 fold up from the bottom wall 32 to form the walled tray. The insert 14 has a length and width adapted to receive and reasonably fit a deceased, adult human body in the supine position in the interior 42, and which is adapted to be received in the viewing tray 12 in the manner discussed further below. The walls 34, 36, 38, 40 of the insert 14 further have a height such that the insert 14, when installed in the tray 12 as discussed below, does not extend to a vertical level above at least the top edge 20*c* of the side panel 20 of the tray 12. It will be appreciated that the insert 14 may include (or contain) other structures, such as a plastic liner, or thin wooden reinforcement strips, etc., as is known in the art.

To these ends, for example, the insert 14 may have the design of the casket inserts shown in U.S. Pat. Nos. 7,337,484 and 8,375,535 (specifically, the low-profile third configuration of FIG. 10 of U.S. Pat. No. 8,375,535). Regardless of how constructed, the insert 14 is configured to be consumed in a cremation process with the deceased. The insert 14 may suitably have a lid, not shown, and which preferably would not be used in the viewing event that involves the viewing tray 12. The lid, such as lids disclosed in the above-reference patents, may further cover the inner foot panel 100 while disposed at least partly in the 42 of the insert 14.

Each of the side walls 34, 36 and end walls 38, 40 is constructed primarily of corrugated paper, and includes an exterior surface, an interior surface, and a top edge. Specifically, as shown in FIG. 1, the first side wall 34 has an exterior surface 34*a*, an interior surface, not visible in FIG. 1, and a top edge 34*c*. Likewise, the second side wall 36 has an exterior surface, not visible in FIG. 1, an interior surface 36*b*, and a top edge 36*c*. Furthermore, the first end wall 38 has an exterior surface 38*a*, an interior surface, not visible in FIG. 1, and a top edge 38*c*, and the second end wall 40 has an exterior surface, not visible in FIG. 1, an interior surface 40*b*, and a top edge 40*c*.

As discussed above, the interior kit 15 in this embodiment includes the bedding kit 16 and the inner foot panel 100. The bedding kit 16 in this embodiment includes first, second, third and fourth cloth assemblies 48, 50, 52, 54. The first cloth assembly 48 includes a first fabric segment 58 secured to a first rigid substrate 60, and the second cloth assembly 50 includes a second fabric segment 62 secured to a second rigid substrate 64. Likewise, the third cloth assembly 52 includes a third fabric segment 66 secured to a third rigid substrate 68, and the fourth cloth assembly 54 includes a fourth fabric segment 70 secured to a fourth rigid substrate 72.

The inner foot panel 100 includes a top panel 102, a first side panel 104, a second panel 106, and an end panel 108. The first side panel 104 is coupled to and extends downward from a first edge 104*a* of the top panel 102, and the second side panel 106 is coupled to and extends downward from a second edge 106*a* of the top panel 102. As discussed further below in detail in connection with FIGS. 2, 3 and 4, the first side panel 104 and the second side panel 106 are configured to be supported by and within a funeral container, for example, the viewing tray 12 (or any traditional casket container) while the top panel 102 covers at least a portion of an interior (e.g. interior 42) of such funeral container.

One feature of the inner foot panel 100 is that a top portion 100*a* of the inner foot panel 100 is narrower than a lower portion 100*b* of the inner foot panel 100. Stated another way, the inner foot panel 100 is wider at the bottom than at the top, which allows the inner foot panel sufficient width to be inserted over the feet, legs and lower torso of the deceased, while narrowing in the upper portions to avoid a distorted appearance during use, and to avoid difficulties in covering the inner foot panel 100 with fabric. In this case, the lower portion 100*b* of the foot panel 100 are portions of the bottoms of the side panels 104 and 106, which collectively define a width w of the bottom footprint of in the inner foot panel 100, and the top portion 100*a* is the peak of the arched top panel 102.

In this embodiment, the narrower top portion 100*a* is achieved in two ways. Firstly, the side panels 104, 106 extend from the edges 104*a*, 106*a* of the top panel 102 in outward and downward manner. Stated another way, the side panels 104, 106 flare outward from the top panel 102 as they extend downward. In addition, the top panel 102 is arched from the first edge 104*a* to the second edge 106*a*, thereby itself narrowing from bottom to top. It will be appreciated that in other embodiments, the top panel 102 may be arched and the side panels 104, 106 are not flared out, or the top panel 102 may be flat and the side panels 104, 106 may be flared. In other embodiments, the top panel 102 may be stepped, or included its own flared subsections. In still another embodiment, it will be appreciated that the entire inner foot panel 100 may be single arched structure, wherein the edges 104*a*, 106*a* of the top panel 102 are generally rounded transitions from largely horizontal tangential areas of the inner foot panel 100 to largely vertical tangential areas of the inner foot panel 100.

Figure 3:
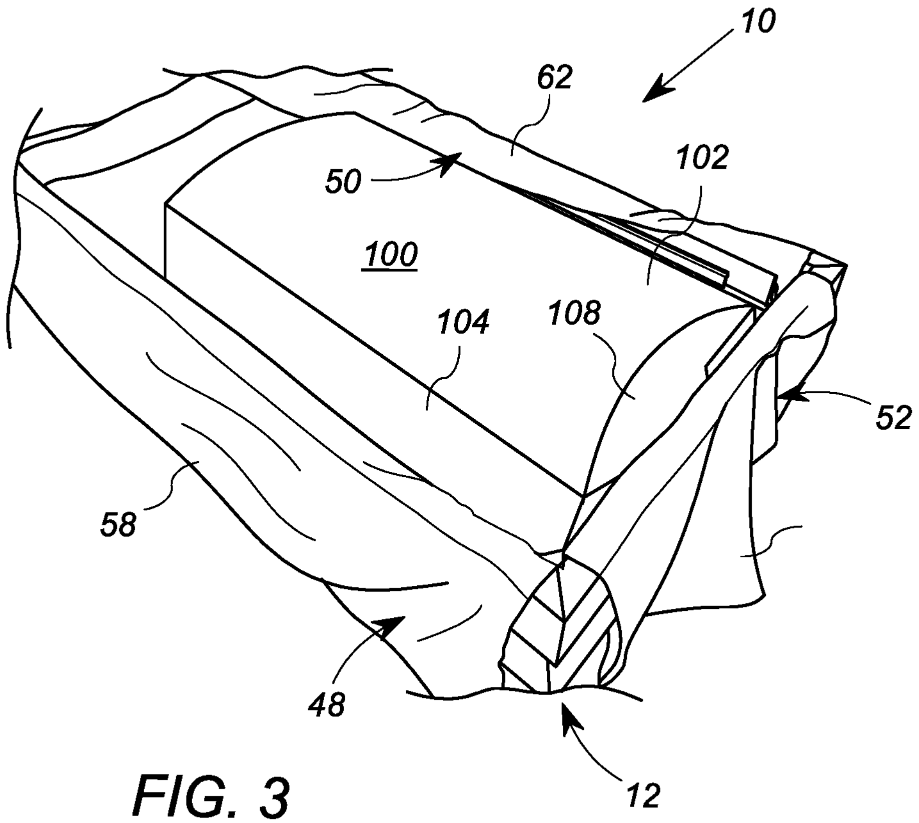
FIG. 3 shows a first fragmentary perspective view of the funerary viewing system of FIG. 1 with a first embodiment of an inner foot panel.
Figure 4:
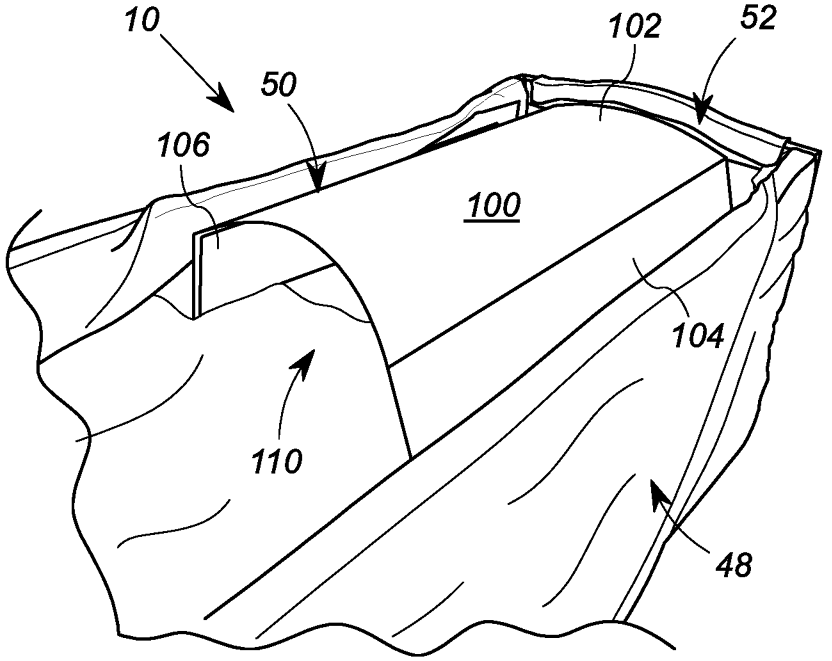
FIG. 4 shows a second fragmentary perspective of the funerary viewing system with an exemplary inner foot panel.
Figure 5:
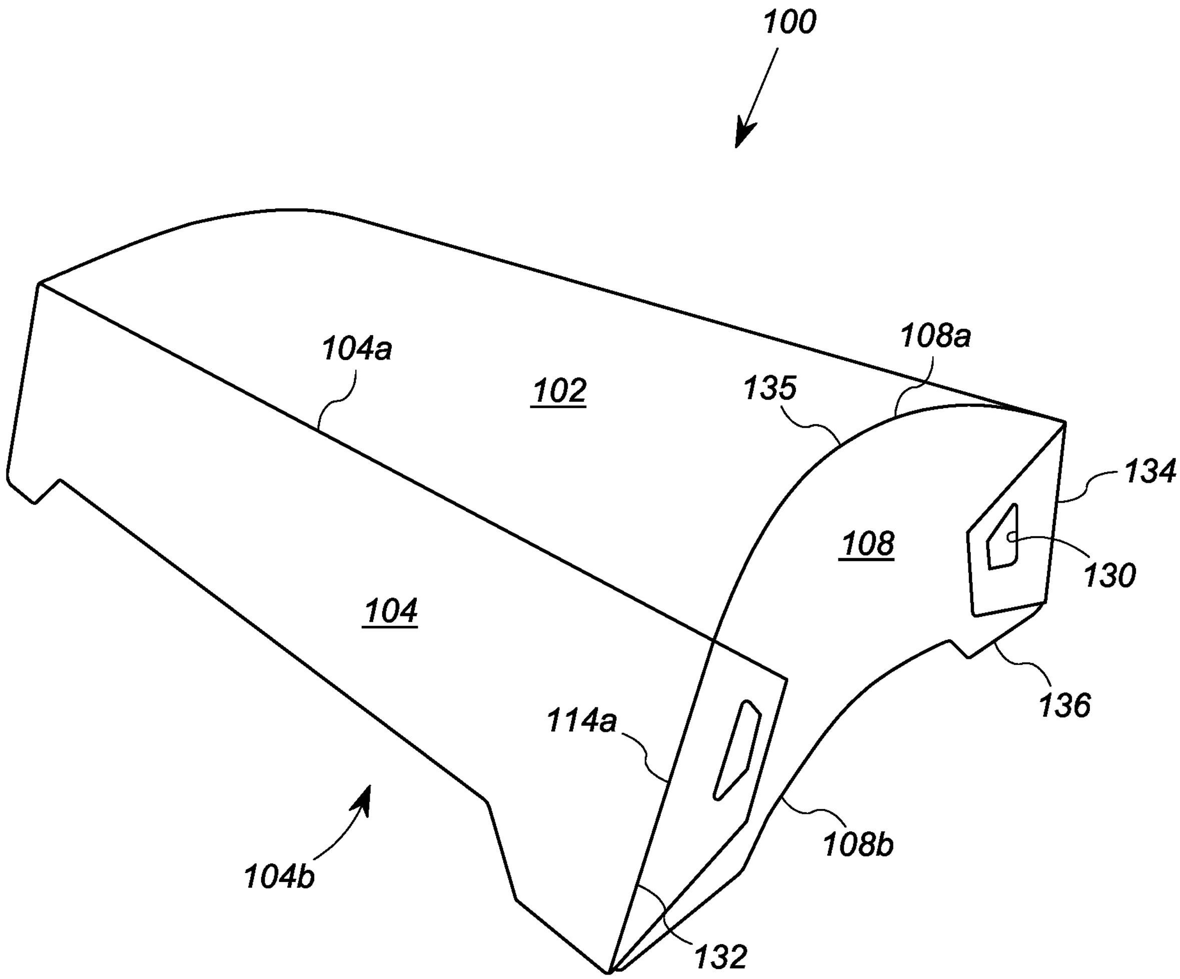
FIG. 5 shows a top perspective view of the exemplary inner foot panel apart from the funerary viewing system.
Figure 6:
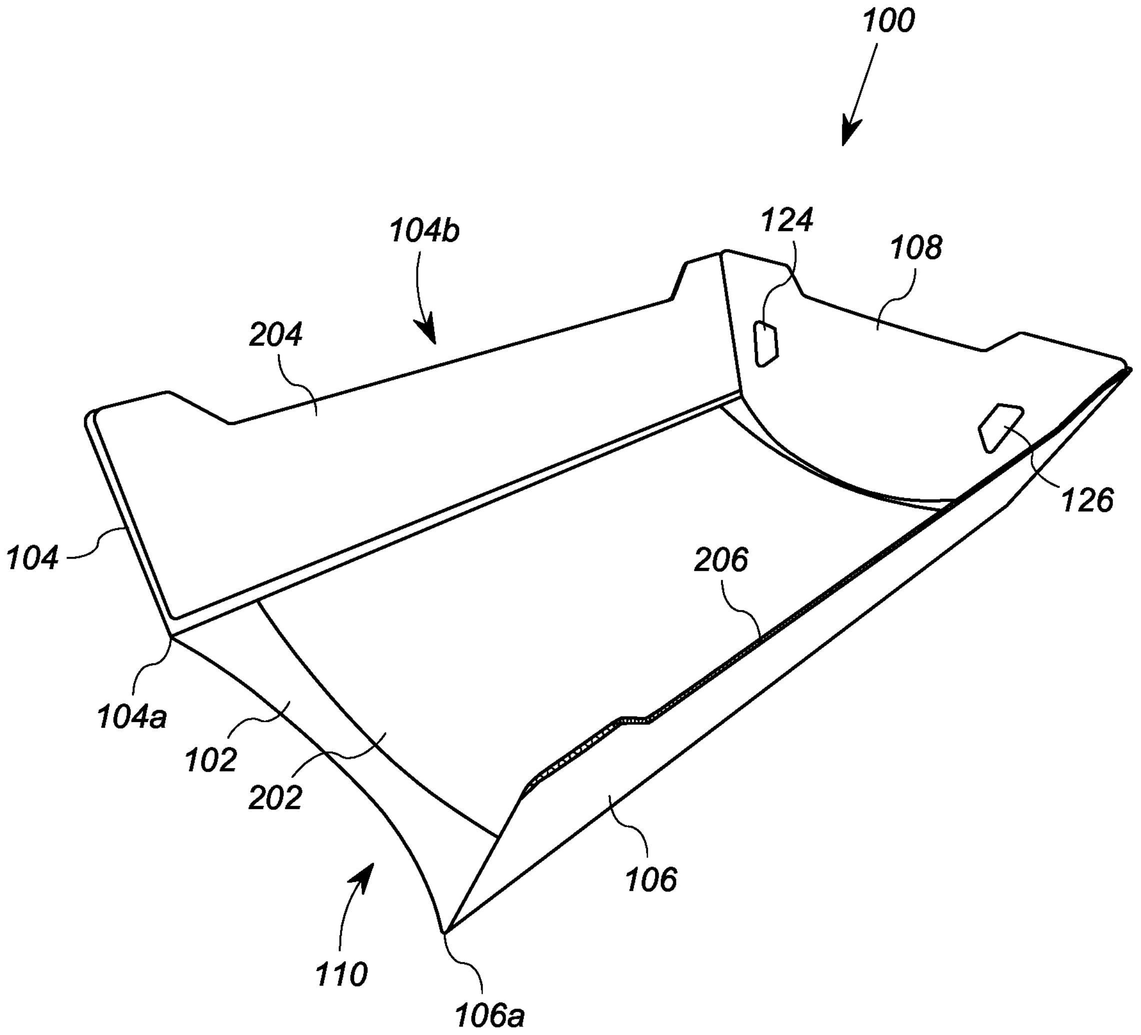
FIG. 6 shows a bottom perspective view of the inner foot panel of FIG. 5.
Figure 7:
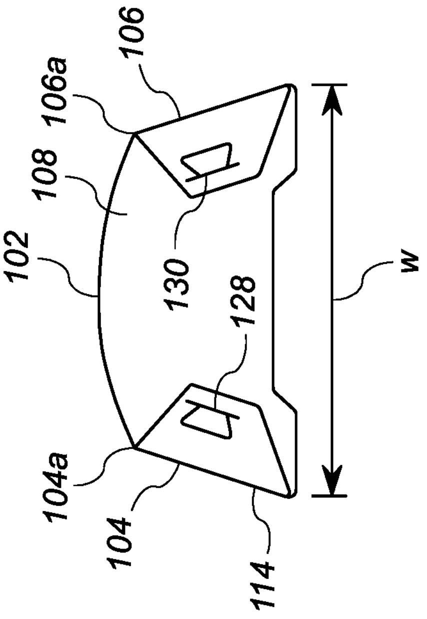
FIG. 7 shows a side plan view of the inner foot panel of FIG. 5.

FIG. 3 shows a first fragmentary perspective view of the funerary viewing system 10 of FIG. 1 with a first embodiment of an inner foot panel 100. FIG. 4 shows a second fragmentary perspective of the funerary viewing system 10 with the inner foot panel 100. FIG. 5 shows a top perspective view of the inner foot panel 100, and FIG. 6 shows a bottom perspective view of the inner foot panel 100. FIG. 7 shows a side plan view of the inner foot panel 100, and FIG. 8 shows a top plan view of an unassembled version of the inner foot panel 100.

With reference to FIGS. 3 to 7, as discussed above, the inner foot panel 100 includes the top panel 102, the first side panel 104, the second side panel 106, the first end panel 108, and defines an open end 110. As shown In FIGS. 3 and 4, when the inner foot panel 100 is used in the funerary viewing system 10 (or any full-couch container), the first end panel 108 is inserted adjacent the end panel 24 and/or end wall 38 of the tray 12 and/or insert 14 (hereinafter referred to alternatively or collectively as "container 12/14"), and the inner foot panel 100 extends partially up towards the head-end of the container 12/14 so that the inner foot panel 100 extends over the feet, legs, and possibly part of the abdomen of the deceased, not shown, in the container 12/14.

Figure 8:
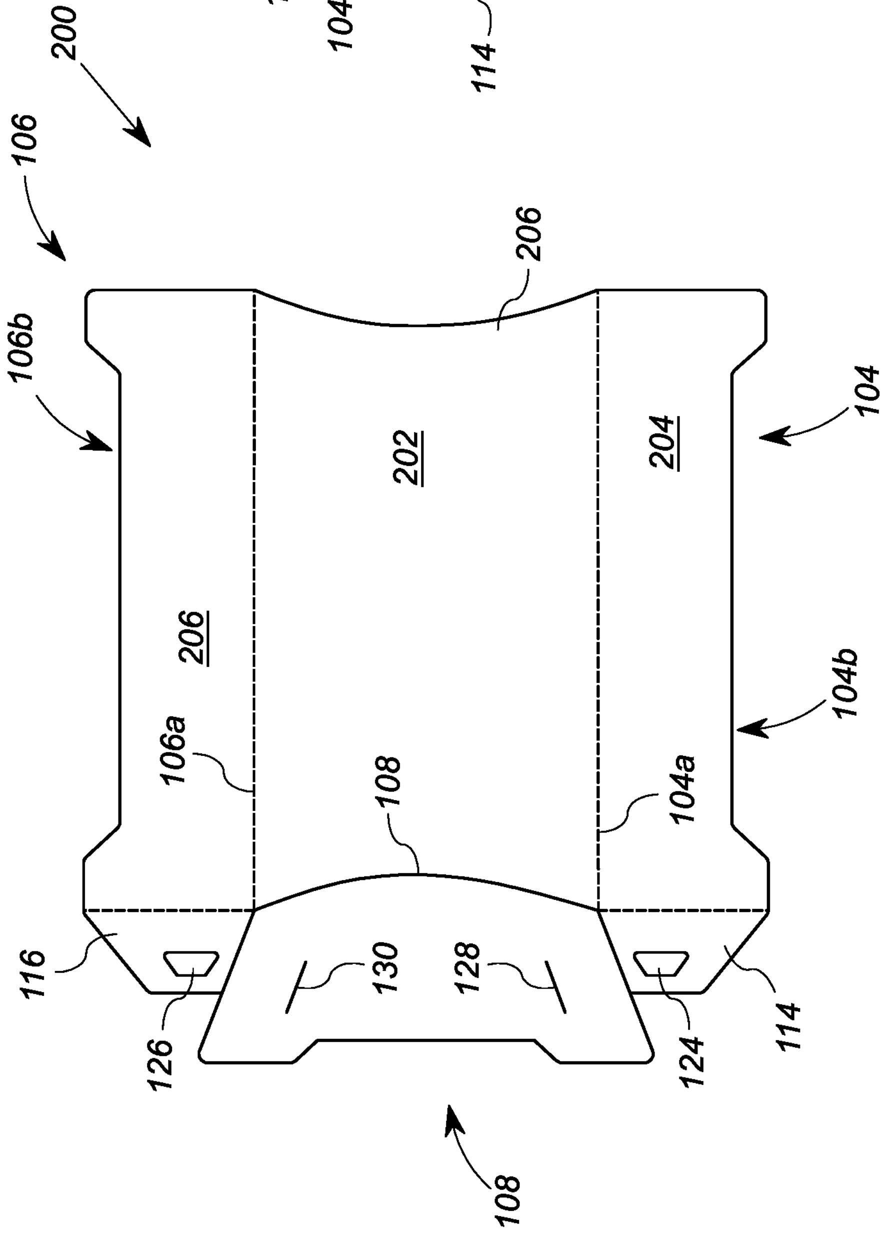
FIG. 8 shows a top plan view of an unassembled version of the inner foot panel of FIG. 5.

Referring to FIGS. 5, 6 and 8, the first side panel 104 is foldably coupled to the top panel 102 via a fold line that defines the first edge 104*a* of the top panel 102. The first edge 104*a* runs along the long dimension (or at least lengthwise with respect to the funeral container) of the inner foot panel 100. The first side panel 104 may have a rectangular shape and a height that extends at least six inches and preferably less than 10 inches in this embodiment. In this embodiment, the first side panel 104 includes an interior bottom cut-out 104*b* forms a concavity 104*b* between the ends of the first side panel 104. The concavity 104*b* allows for better fit when the inner foot panel 100 is disposed in the container 12/14 by making room for irregularities in the container 12/14 caused, for example, by bunching or placement of the cloth interior elements.

A first connecting flap 114 is foldably coupled to a first end of the first side panel along a fold line 114*a* that is perpendicular to and intersects the first fold line 104*a*. The first connecting flap 114 includes a first connecting tab 124 located on the interior of the flap 114. The first connecting tab 124 is formed by a cut-out having one side foldably attached to the remaining structure of the flap 114. Thus, the first connecting tab 124 may rotate independently to the remainder of the flap 114 while still being connected thereto.

The second side panel 106 likewise is foldably coupled to the top panel 102 via a fold line the forms the second edge 106*a* of the top panel 102. The second edge 106*a* runs along the long dimension of the inner foot panel 100. The first and second edges 104*a* and 106*a* are parallel in this embodiment. The first edge 104*a* and the second edge 106*a* are aligned with the parallel disposition of the side panels/walls 20/34, 22/36 of the container 12/14 in which they are received. In the event that another container is used with side panels that are skewed or angled, the fold lines or edges 104*a*, 106*a* may be similarly angled with respect to each other. The second side panel 106 may also have a rectangular shape and a height that extends at least six inches and preferably less than 10 inches in this embodiment. In this embodiment, the second side panel 106 includes an interior bottom cut-out 106*b* forms a concavity between the ends of the first side panel 104.

A second connecting flap 116 is foldably coupled to a first end of the first side panel along a fold line 116*a* that is perpendicular to and intersects the second fold line forming the second edge 106*a*. The second connecting flap 116 includes a second connecting tab 126 located on the interior of the flap 116. The second connecting tab 126 is formed by a cut-out having one side foldably attached to the remaining structure of the flap 116. Thus, the second connecting tab 126 may rotate independently to the remainder of the flap 116 while still being connected thereto.

The side panel 104, 106 are generally configured to fit along and against the sides and bottom of the container (e.g. tray 12, insert 14, or other casket or insert) in which it is received. (See generally FIGS. 3, 4). To this end, the first and second edges 104*a*, 106*a* are spaced apart by a width. As discussed above, and as shown in FIG. 7, the width of the top panel 102 is somewhat less than that width w defined by the bottom of the inner foot panel 100. The width w in this embodiment is also slightly less than the width of the insert 14, to allow insertion of the inner foot panel 100 into the interior of the insert 14.

The first end panel 108 is foldably connected to the arched top via a fold line defining a third edge 108*a* of the top panel 102. In this embodiment, the fold line defining the third edge 108*a* is arcuate to allow the end panel 108 to extend downward from the arched top panel 102. As shown particular in FIGS. 5 and 7, the end panel 108 has a shape configured to substantially cover the opening formed by the side panels 104, 106 and the top panel 102. To this end, the end panel 108 includes two side edges 132, 134, an arched top edge 135 extending between the side edges 132, 134, and a bottom edge 136 extending between the side edges 132, 134. The bottom edge 136 includes a concave cut-out 108*b* similar to those of the side walls 104, 106.

The first end panel 108 further includes two slits 128, 130 configured to receive, respectively, the first and second connecting tabs 124, 126 of the connecting flaps 114, 116.

Referring specifically to FIG. 8, the inner foot panel 100 is formed from a flexible substrate 200, which in this embodiment is a foldable chip board or particle board blank that includes the top panel 102, the side panels 104, 106 and the end panel 108. As also shown in FIG. 6, the inner foot panel 100 in this embodiment further includes a top reinforcement panel 202, a first side reinforcement panel 204 and a second reinforcement panel 206. The top reinforcement panel 202 is a substrate formed of a paper product that is preferably sturdier and thicker than the flexible substrate 200. In this embodiment, the top reinforcement panel 202 comprises single wall corrugated fiberboard. The top reinforcement panel 202 has a shape which is substantially coextensive with the top panel 102 but has a width that is less than a width of the top panel 102. The top reinforcement 202 is affixed to the underside of the top panel 102.

The side reinforcement panels 204, 206 can also be suitably formed of a paper product that is sturdier and thicker than the flexible substrate 200. The side reinforcement panels 204, 206 may suitable be c-flute corrugated fiberboard. The side reinforcement panels 204, 206 are affixed to the respective inner sides of side panels 104, 106, and are largely coextensive therewith, but have a width that is less. The reduced widths of the reinforcement panels 202, 204 and 206 allow for folding of the flexible substrate 200 into the shape of the inner foot panel 100 shown in FIGS. 1, 5 and 6.

To assemble the inner foot panel 100, a single piece of chipboard is die cut into the flat blank 200. The flat blank 200 is placed in a form, not shown, but which includes the arched shape. The top reinforcement panel 202 is then glued to the back side of the top panel 102 in the mold. Once the glue sets, the arc is formed. The side reinforcement panels 204, 206 are then glued to the side walls 104, 106, respectively, for added reinforcement.

In use, the completed inner foot panel 100 is inserted into the container 12/14, for example, inside the insert 14, over the feet, legs and possibly adjacent portions of the torso of the deceased, not shown. Fabric sheets (e.g. cloth assemblies 48, 50, etc.) are placed over the top panel 102 and the upper torso of the decease as preferred. The face of the deceased may be left exposed.

More specifically, referring again to FIGS. 1 and 2, in operation, the insert 14, bedding kit 16 and inner foot panel 100 are often packaged together, as they are each intended for a single use. Accordingly, to prepare for the display event, the bedding kit 16 and inner foot panel 100 are separated from the insert 14, and the insert 14 is prepared to receive the deceased. Thereafter, the deceased is positioned (directly or indirectly) on the bottom wall 32 of the insert 14.

Thereafter, the inner foot panel 100 is placed over the legs, feet, and in some cases, a portion of the torso. The insert 14 is provided on the tray 12, i.e. on the bottom panel 18. Alternatively, in other embodiments, the insert 14 is provided into full-size rental casket. It will be appreciated that in this embodiment, "on the bottom panel" in this embodiment means on roller assemblies 28 that are disposed on and directly supported by the bottom panel 18. In other embodiments, the insert 14 can be provided directly on the bottom panel 18, provided on the bottom panel 18 via skids, or provided on the bottom panel 18 via other intermediary structures supported on the bottom panel 18.

In some embodiments, the second end panel 26 of tray 12 is pivotably attached so that it can be rotated downward to form a side opening 27 in the tray. The insert 14 can then be slid onto the bottom panel 18 through the side opening 27. After, the insert 14 is fully disposed in the interior 29, the second end panel 26 can be pivoted upward such that extends upward from the bottom panel 18, as shown in FIG. 1. In other embodiments, instead of a pivoting second end panel 26, other arrangements for providing the insert 14 on the tray 12 may be used that avoid having to manipulate the insert 14 into the fully assembled tray 12 shown in FIG. 1. Such methods typically involve at least one of the side panels 20, 22 and/or end panels 24, 26 being rotated or removed, and then subsequently moved so as to extend upward from the bottom panel 18 (i.e. complete the closed tray 12).

Thereafter, the cloth assemblies 48, 50, 52 and 54 are installed. Specifically, the first cloth assembly 48 is installed so that the first fabric segment 58 covers at least a portion of a top edge 34*c* of the first side wall 34 of the insert 24, at least a portion of the deceased human body, and at least a portion of the inner foot panel 100. To this end, the first lengthwise edge 110 the substrate 60 may be inserted between the interior surface 20*b* of the side panel 20 of the tray 12 and the exterior surface 34*a* of the side wall 34 of the insert 14.

The second cloth assembly 50 is similarly installed between the second side panel 22 of the viewing tray 12 and the second side wall 36 of the insert 14. Once the second cloth assembly 50 is installed, the first fabric segment 58 and second fabric segment 62 are draped toward each other to overlap, and to cover the deceased and the inner foot panel 100. The top corners of each of the fabric segments 58, 62 can be folded diagonally back to reveal the face and part of the upper torso as desired. Such positioning of the fabric segments 58, 62 allows for sufficient identification of the deceased, and can be desirable for a short viewing event.

The third cloth assembly 52 is installed between the first end panel 24 of the viewing tray 12 and the first end wall 38 of the insert 14 in the same manner as described above. The third cloth assembly 52 is proximate the head of the deceased. For the viewing event, the third fabric segment may be inserted below the head of the deceased to cover any otherwise visible portions of the bottom wall 32, in addition to covering the top edge 38*c* of the first end wall 38 of the insert 14.

Similarly, the fourth cloth assembly 54 is installed between the second end panel 26 of the viewing tray 12 and the second end wall 40 of the insert 14 in the same manner as described above. The fourth cloth assembly 54 is proximate the feet of the deceased. For the viewing event, the fourth fabric segment 70 may be top panel 102 and end panel 108 of the inner foot panel 100, to overlap and cover possible exposure at the ends of the first and second fabric segments 58, 62 at the end of the inner foot panel 100.

FIG. 2 shows a perspective view of a deceased in the casket arrangement 10 of FIG. 1 fully assembled, with the cloth assemblies installed. As shown in FIG. 2, the insert 14 and the inner foot panel 100 is fully covered and not visible for the viewing event in the finished casket arrangement 10.

Referring again to FIG. 5, it will be appreciated that fewer cloth assemblies may be used, and still achieve some of the advantages of the embodiment disclosed herein. For example, it is possible for the first cloth assembly 48 alone have a fabric segment sufficient to cover the entire body of the deceased and inner foot panel 100, and most or all of the top edges 34*c*, 36*c*, 38*c* and 40*c* of the insert 14. Alternatively, any combination of cloth assemblies may be used in other configurations. The ease of using the substrate(s) to insert and position the cloth assemblies would provide at least some benefits in such other configurations as well.

In this embodiment, after installation of the cloth assemblies 48, 50, 52, and 54, the viewing event may take place. The face of the deceased will be visible if desired, and little or no portion of the corrugated paper insert 14 will be readily visible when viewing the deceased. The viewing tray 12 provides a pleasing aesthetic external shell, and the reduced depth of the viewing tray 12 enables viewing of the face of the deceased without a bed raising mechanism. The inner foot panel 100 provides a smooth, rounded support for the fabric of the cloth assemblies, such that they lie well and avoid the discontinuity of the shape of the feet.

After the viewing event, the insert 14 and the deceased human body are removed using the reverse operation(s) of those described above. In the embodiment of FIGS. 1 and 2, the second end panel 26 is unlatched and rotated downward, and the insert 14 with the deceased is removed laterally through the resulting opening 27 on the roller assemblies 29. In addition, the cloth assemblies 48, 50, 52 and 54 are removed from the viewing tray 12. Thereafter, the insert 14, the inner foot panel 100, the deceased human body and cloth assemblies 48, 50, 52 and 54 are also advanced to further processing, which may suitably be cremation. It would nevertheless be possible to inter the insert 14, the inner foot panel 100 and the deceased without cremation.

Thereafter, the viewing tray 12 may be used again. It will be appreciated that the above operations may be carried out in essentially the same manner with a full-size rental casket, including those having a full-couch configuration. It will also be appreciated that other fabric arrangements may be used to cover a portion of the deceased and the inner foot panel 100. The inner foot panel 100 may also be used in a non-rental casket or cremation container having a full-couch configuration.

It will be appreciated that the above described embodiments are exemplary, and that those of ordinary skill in the art may readily devise their own implementations and modifications that incorporate the principles of the present invention and fall within the spirit and scope thereof. By way of example, it will be appreciated that various advantages of the interior kit described herein may be obtained even if a reusable shell other than the viewing tray is used, such as a traditional rental casket.

It will further be appreciated that embodiments and modifications of the inner foot panel described herein may be used in any funerary event or circumstance in which some manner of fabric or flexible covering may unevenly or coarsely drape over the feet or lower (inferior) extremities of the deceased. For example, in green burial embodiments, the inner foot panel may be used in a shroud interior with a shroud fabric disposed over top.

Likewise, in addition to use with any cloth assemblies described herein, the inner foot panel embodiments described herein and modifications thereof can be used with any suitable flexible fabric covering, including but not limited to linens, quilted fabric, duck cloth, blankets, and even flexible paper.

What is claimed is:

1. An interior kit for a funeral container, comprising:

an inner foot panel having a top panel, a first side panel coupled to and extending downward from a first edge of the top panel, and a second side panel coupled to and extending downward from a second edge of the top panel, the first side panel and second side panel configured to be supported by and within the funeral container while the top panel covers at least a portion of an interior of the funeral container, wherein a top-most portion of the inner foot panel is narrower than a lower-most portion of the inner foot panel; and at least one flexible fabric sheet configured to cover the top panel and a portion of a deceased disposed beyond the top panel within the funeral container.

2. The interior kit of claim 1, wherein the first side panel extends downward at a non-vertical angle from the first edge of the top panel.

3. The interior kit of claim 2, wherein the top panel is arched.

4. The interior kit of claim 1, wherein the top panel is arched.

5. The interior kit of claim 4, wherein the top panel is foldably connected to the first side panel and top panel is foldably connected to the second side panel.

6. The interior kit of claim 1, wherein the first side panel has a bottom edge that extends from a first end to a second end, and wherein the bottom edge includes a concavity between the first end and the second end.

7. The interior kit of claim 1, further comprising an end panel operably connected to the first side panel and to the second side panel, the end panel configured to be disposed within the funeral container.

8. An interior foot panel for a funeral container, comprising:

a top panel formed at least in part from a first flexible substrate, a first side panel formed at least in part from the first flexible substrate, the first side panel foldably coupled to and extending downward from a first edge of the top panel;

a second side panel formed at least in part from the first flexible substrate, the second side panel foldably coupled to and extending downward from a second edge of the top panel, wherein the first side panel and second side panel are configured to be supported by and within the funeral container while the top panel covers at least a portion of an interior of the funeral container;

wherein a top-most portion of the interior foot panel is narrower than a lower-most portion of the interior foot panel; and wherein the first side panel extends downward at a non-vertical angle from the first edge of the top panel.

9. The interior foot panel of claim 8, wherein the top panel is arched.

10. The interior foot panel of claim 8, further comprising an end panel formed at least in part from the first substrate, the end panel foldably coupled to and extending downward from a third edge of the top panel.

11. The interior foot panel of claim 10, further comprising flaps foldably connected to at least one of the first side panel, the second side panel, and the end panel and wherein at least a first flap of the flaps couples the first side panel to the end panel, and wherein at least a second flap of the flaps couples the second side panel to the end panel.

12. An interior foot panel for a funeral container, comprising:

a top panel formed at least in part from a first flexible substrate, a first side panel formed at least in part from the first flexible substrate, the first side panel foldably coupled to and extending downward from a first edge of the top panel;

a second side panel formed at least in part from the first flexible substrate, the second side panel foldably coupled to and extending downward from a second edge of the top panel, wherein the first side panel and second side panel are configured to be supported by and within the funeral container while the top panel covers at least a portion of an interior of the funeral container;

wherein a top-most portion of the interior foot panel is narrower than a lower-most portion of the interior foot panel; and further comprising a second substrate coupled to the top panel formed at least in part from the first substrate, and wherein:

the top panel has a first width defined from the first edge to the second edge; and the second substrate has a second width that is less than or equal to the first width.

13. The interior foot panel of claim 12 wherein the first substrate is thinner than the second substrate.

14. The interior foot panel of claim 13, wherein the first substrate is particle board and the second substrate is corrugated fiberboard.

15. The interior foot panel of claim 12, wherein the first side panel extends downward at a non-vertical angle from the first edge of the top panel.

16. The interior foot panel of claim 12, further comprising a third substrate coupled to the first side panel, and wherein:

the third substrate is sturdier than the first side panel, and is configured to provide reinforcement to the first side panel.

17. The interior foot panel of claim 16, wherein the third substrate is formed from corrugated fiberboard.

18. The interior foot panel of claim 16, wherein the top panel is arched.

19. The interior foot panel of claim 12, wherein the top panel is arched.

* * * * *